D. S. COLLINS.
SELF MEASURING VISIBLE LIQUID PUMP.
APPLICATION FILED JAN. 3, 1920.
1,418,129.
Patented May 30, 1922.
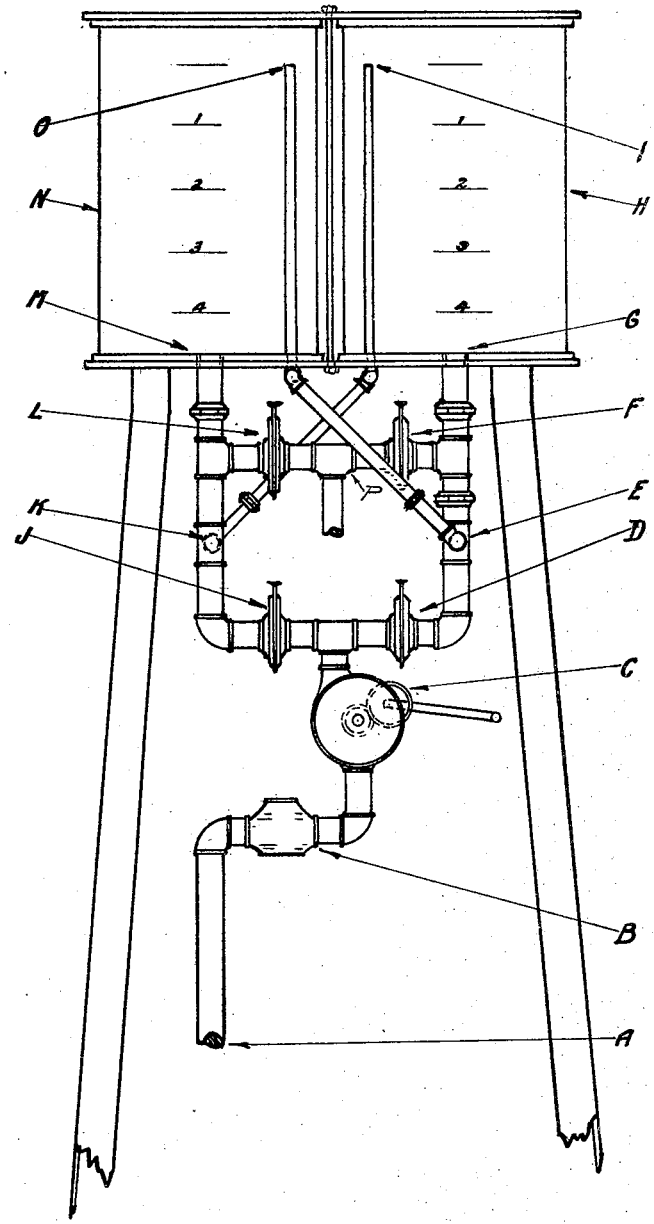
Inventor;
D.S.Collins.
by T. K. Bryant
atty.

UNITED STATES PATENT OFFICE.

DONLEY SAXTON COLLINS, OF CEDAR RAPIDS, IOWA.

SELF-MEASURING VISIBLE LIQUID PUMP.

1,418,129.  Specification of Letters Patent.  Patented May 30, 1922.

Application filed January 3, 1920. Serial No. 349,224.

*To all whom it may concern:*

Be it known that I, DONLEY S. COLLINS, a citizen of the United States, residing at Cedar Rapids, in the county of Linn and the State of Iowa, have invented a new and useful Self-Measuring Visible Liquid Pump, of which the following is a specification.

My invention relates to the visible dispensation of gasoline through the medium of two glass cylinders. The principal object of this invention is the provision of a storage tank having a pump associated therewith, a measuring tank in connection with the storage tank and adapted to be charged by the pump and means associated with the storage tank and measuring tank whereby liquid pumped from the storage tank to the measuring tank is held against returning to the storage tank thereby increasing the speed, accuracy and efficiency of the device. These objects are obtained by the pipe connections and mechanism illustrated in the accompanying drawing.

The gasoline is drawn from a storage tank through pipe A and meter B by a geared rotary pump C, after opening a quick action gate valve D.

The liquid then rises into the glass cylinder H, to pre-determined height I, whereupon any excess liquid over-flows through opening at I, and is carried by a pipe through reducing T at K, where in seeking its level will rise through inlet M into the glass cylinder N. Gate valve D is now closed and after liquid has settled to I, gate valve F is opened and the liquid is allowed to run out through T P into the receptacle of the customer.

Cylinder N is now filled in a similar manner by opening quick action gate valve J until liquid has reached a similar pre-determined level O, where upon it over-flows and is carried by a pipe through reducing T E and seeks its level in glass cylinder H.

As the over-flow from each cylinder returns to the other cylinder instead of returning to the tank, all the liquid passing through the meter is sold and the meter-record can be kept for any length of time.

As both cylinders are in a measure independent, one cylinder may be filled while the other is draining, thereby accelerating the speed of dispensing the liquid.

The cylinders H and N will be graduated into gallons and parts of gallons, and any desired amount may be obtained by shutting gate valves F or L respectively, when the desired level has been reached in the cylinder H or N.

I am aware that prior to my invention other visible liquid dispensing pumps have been produced; I therefore do not claim such a pump as mine broadly.

I claim:

1. In a self measuring and dispensing device for liquids a pair of tanks having means to indicate the quantity of liquid therein, connections with controlling means for permitting supply of liquid to enter either of said tanks, connections for delivering the overflow from either tank to the other, and means associated with the said inlet means to permit the discharge of the contents of either or both of said tanks at will.

2. In a self measuring and dispensing device for liquids, a pair of tanks having means to indicate the quantity of liquid therein, connections for controlling and permitting the liquid to enter either or both of said tanks a fluid inlet pipe communicating with the connections for filling of said tanks, overflow means in each of said tanks and means connecting the overflow means to said first named connections, and connections associated with the said inlet connections to permit of the discharge of the contents of either or both of said tanks at will.

3. In a self measuring and dispensing device for liquids, a pair of tanks having means to indicate the quantity of liquid therein, filling connections for said tank, overflow means located in each of said tanks and connected to said filling means, and means associated with said inlet means to permit of the discharge of the contents of either or both of said tanks at will.

4. In a self-measuring and dispensing device for liquids, a pair of tanks having means to indicate the quantity of liquid therein, connections for permitting supply of liquid to either of said tanks, means within each tank for conveying the overflow of one tank to the inlet means of the opposite tank and means associated with said inlet means for permitting discharge of the liquid from either of said tanks.

5. In a self-measuring and dispensing device for liquids, a pair of tanks having means to indicate the quantity of liquid therein, means for supplying liquid to one of said tanks, an overflow pipe within and adjacent the top of each tank, each of said overflow pipes having connections with the inlet means of each opposite tank whereby the overflow of one tank is conveyed to the inlet of the opposite tank and means associated with the said inlet means for permitting discharge of liquid from either of said tanks.

DONLEY SAXTON COLLINS.